US012632331B2

(12) United States Patent
Dummi Kubendrappa et al.

(10) Patent No.: US 12,632,331 B2
(45) Date of Patent: May 19, 2026

(54) METHOD AND SYSTEM FOR IMPROVING SERVICEABILITY OF EDGE DEVICES IN AN EDGE ESTATE

(71) Applicant: Dell Products L.P., Round Rock, TX (US)

(72) Inventors: Veerabhadra Swamy Dummi Kubendrappa, Bengaluru (IN); Gaurav Kumar, Khagaria (IN); Ankita Gupta, Bikaner (IN); Shrinidhi Prakash Pandurangi, Bengaluru (IN); Nagaraja Bhaskar Naidu, Bengaluru (IN); Ajith George, Thodupuzha (IN)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 18/776,327

(22) Filed: Jul. 18, 2024

(65) Prior Publication Data

US 2026/0023641 A1     Jan. 22, 2026

(51) Int. Cl.
*G06F 11/07* (2006.01)
(52) U.S. Cl.
CPC ...... *G06F 11/0793* (2013.01); *G06F 11/0709* (2013.01)
(58) Field of Classification Search
CPC .......................... G06F 11/0709; G06F 11/0793
See application file for complete search history.

(56) References Cited

U.S. PATENT DOCUMENTS

| | | | | |
|---|---|---|---|---|
| 2008/0298229 A1* | 12/2008 | Ballantyne | .......... | H04L 41/0654 370/218 |
| 2014/0376385 A1* | 12/2014 | Boss | .................. | G06F 11/2294 370/242 |
| 2021/0326128 A1* | 10/2021 | Malladi | ............. | H04L 12/40006 |
| 2023/0385164 A1* | 11/2023 | Parekh | .................. | G06F 11/203 |

* cited by examiner

*Primary Examiner* — Jigar P Patel
(74) *Attorney, Agent, or Firm* — Chamberlain, Hrdlicka, White, Williams & Aughtry; Aly Z. Dossa

(57) ABSTRACT

A method for managing edge devices (EDs) includes: identifying, based on connectivity of each ED, a set of accessible EDs and a set of non-accessible EDs in an edge estate (EE); determining, based on the identifying, that a first ED in the EE is accessible and a second ED in the EE is non-accessible; sending, based on the determining, a device debug request related to the second ED to the first ED; receiving, in response to the device debug request, metadata associated with the second ED from the first ED; analyzing the metadata to generate a set of solutions to resolve the issue; providing the issue and set of solutions to a user to notify the user about a status of the second ED; after the providing: receiving, from the user, a selected solution to be applied on a computing device; applying the selected solution on the computing device.

17 Claims, 9 Drawing Sheets

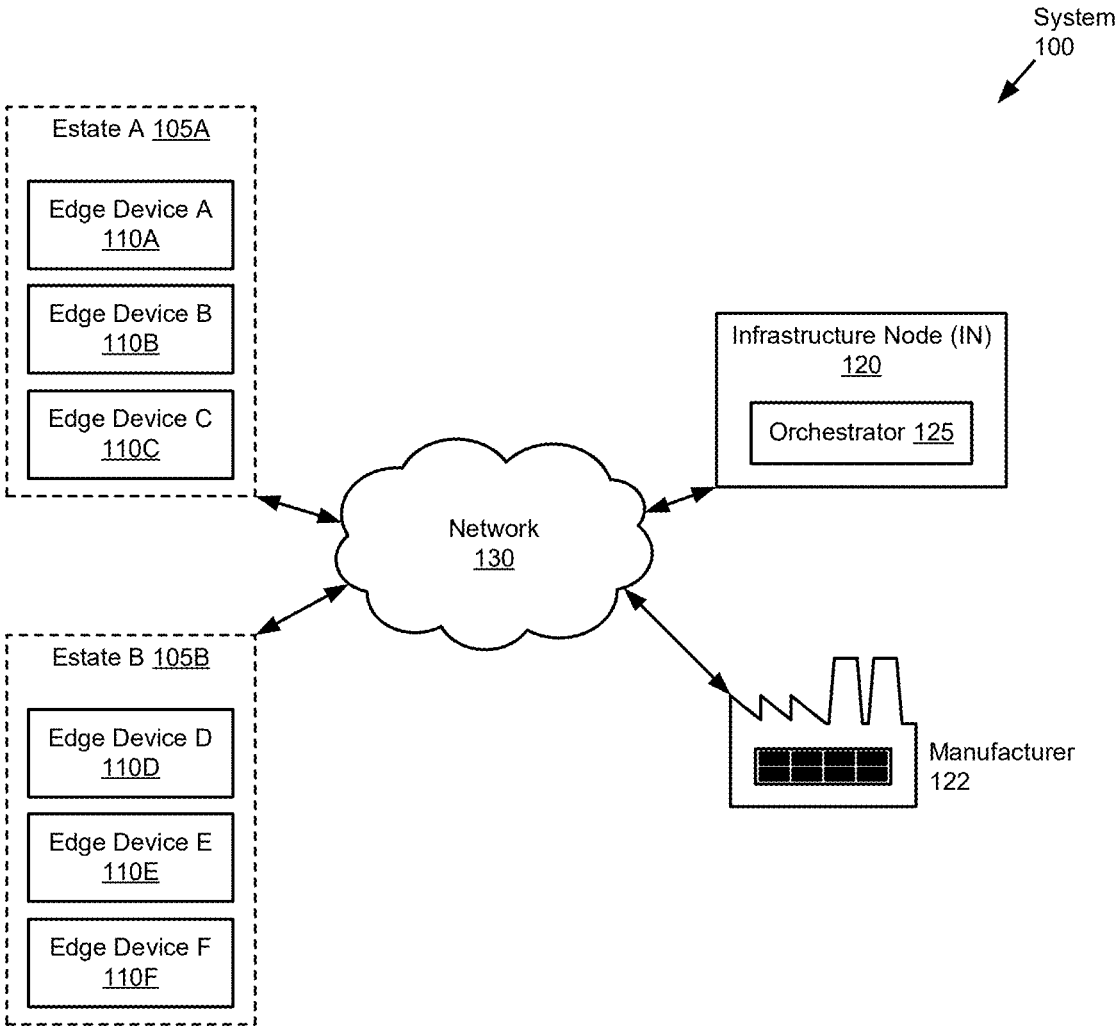
FIG. 1.1

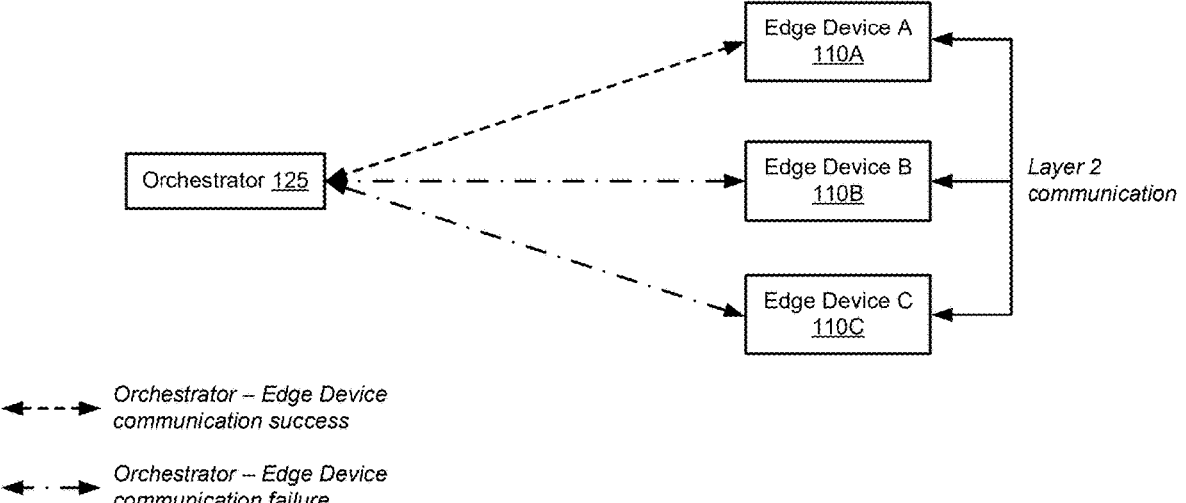
FIG. 1.2

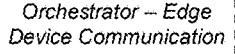
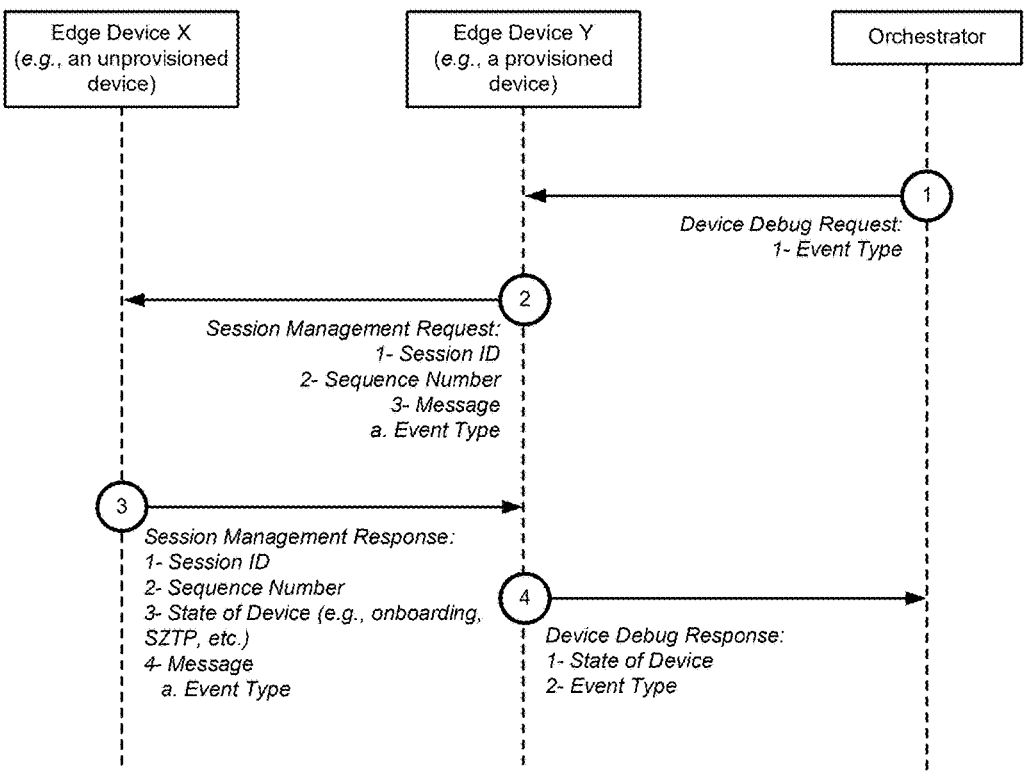
FIG. 2.1

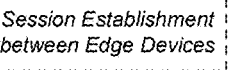
*Session Establishment between Edge Devices*
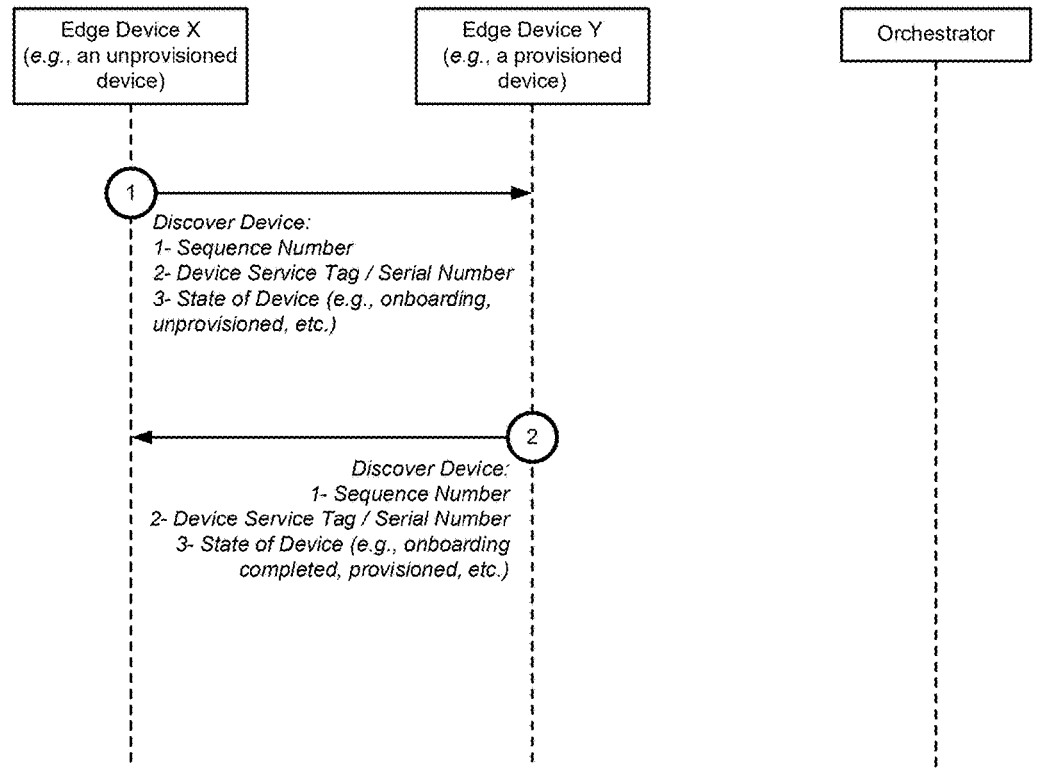
FIG. 2.2

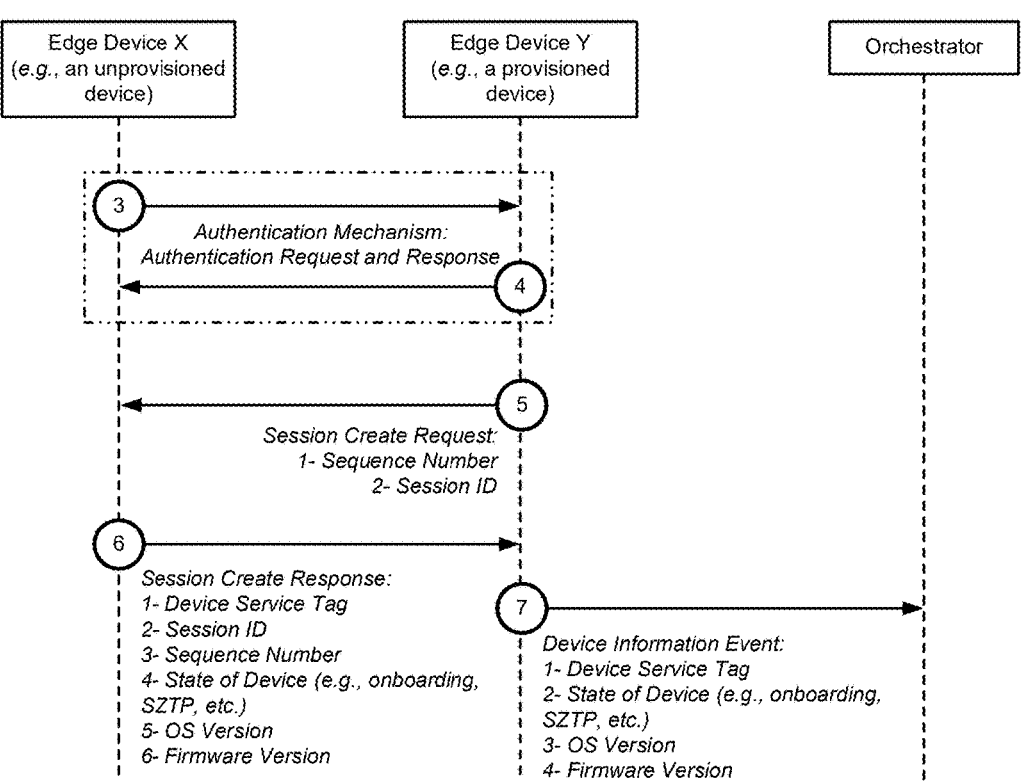
FIG. 2.3

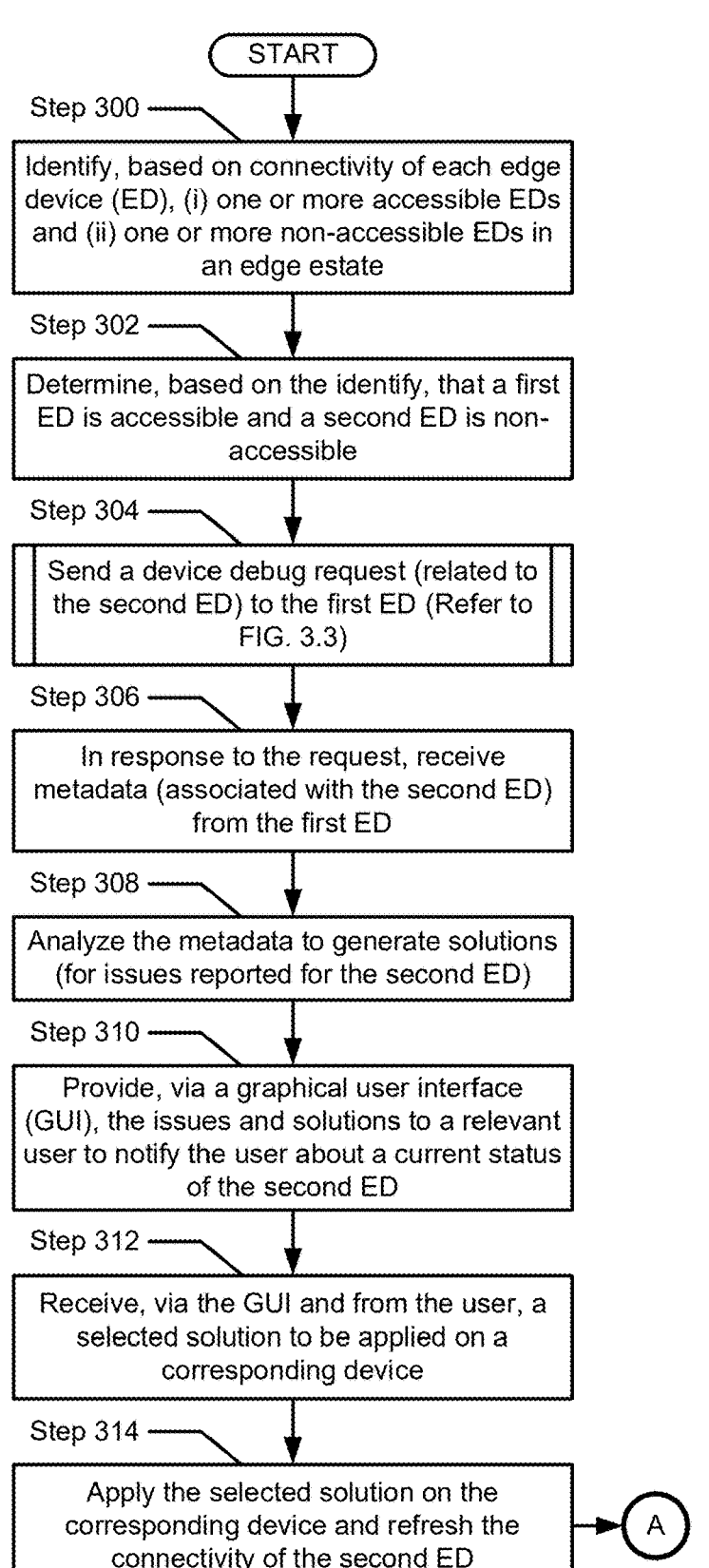

Perspective:
Orchestrator

START

Step 300 — Identify, based on connectivity of each edge device (ED), (i) one or more accessible EDs and (ii) one or more non-accessible EDs in an edge estate Step 302 — Determine, based on the identify, that a first ED is accessible and a second ED is non-accessible Step 304 — Send a device debug request (related to the second ED) to the first ED (Refer to FIG. 3.3)

Step 306 — In response to the request, receive metadata (associated with the second ED) from the first ED Step 308 — Analyze the metadata to generate solutions (for issues reported for the second ED)

Step 310 — Provide, via a graphical user interface (GUI), the issues and solutions to a relevant user to notify the user about a current status of the second ED Step 312 — Receive, via the GUI and from the user, a selected solution to be applied on a corresponding device Step 314 — Apply the selected solution on the corresponding device and refresh the connectivity of the second ED

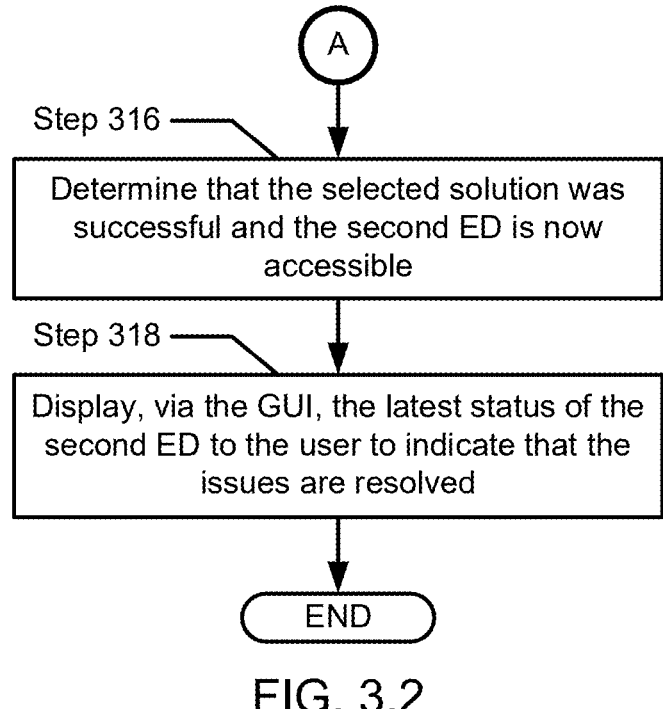
*Perspective:*
*Orchestrator*
Step 316
Determine that the selected solution was successful and the second ED is now accessible
Step 318
Display, via the GUI, the latest status of the second ED to the user to indicate that the issues are resolved
END
FIG. 3.2

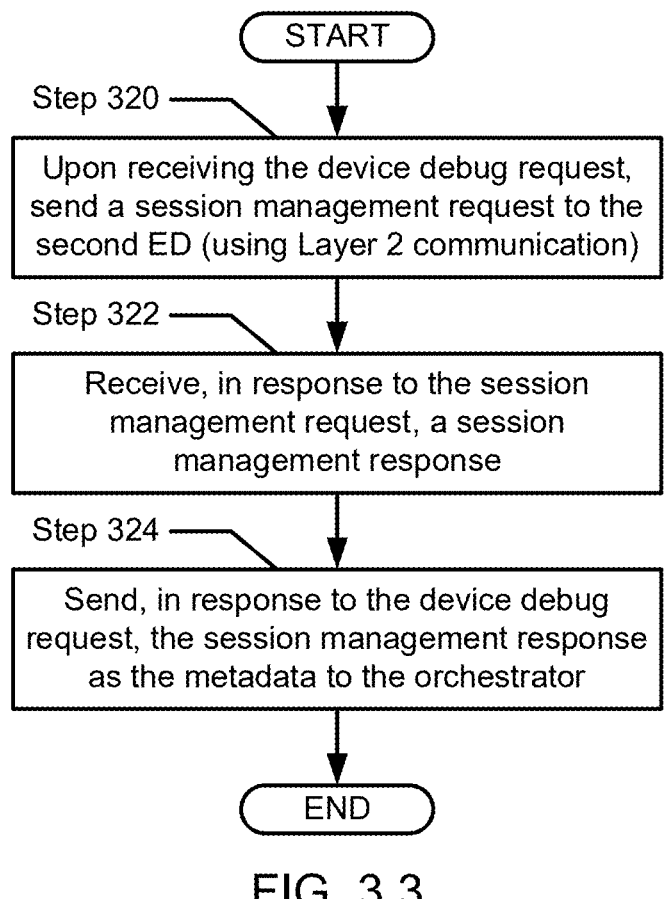

Perspective:
Edge Device

START

Step 320 ──

Upon receiving the device debug request, send a session management request to the second ED (using Layer 2 communication)

Step 322 ──

Receive, in response to the session management request, a session management response Step 324 ──

Send, in response to the device debug request, the session management response as the metadata to the orchestrator

END

METHOD AND SYSTEM FOR IMPROVING SERVICEABILITY OF EDGE DEVICES IN AN EDGE ESTATE

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows a diagram of a part of the system (shown in FIG. 1.1) in accordance with one or more embodiments disclosed herein.

FIG. 2.1 shows an example "orchestrator-edge device communication" scenario in accordance with one or more embodiments disclosed herein.

FIGS. 2.2-2.3 show an example session establishment scenario between edge devices in accordance with one or more embodiments disclosed herein.

FIGS. 3.1-3.3 show a method for managing edge devices in accordance with one or more embodiments disclosed herein.

DETAILED DESCRIPTION

Figure 4:
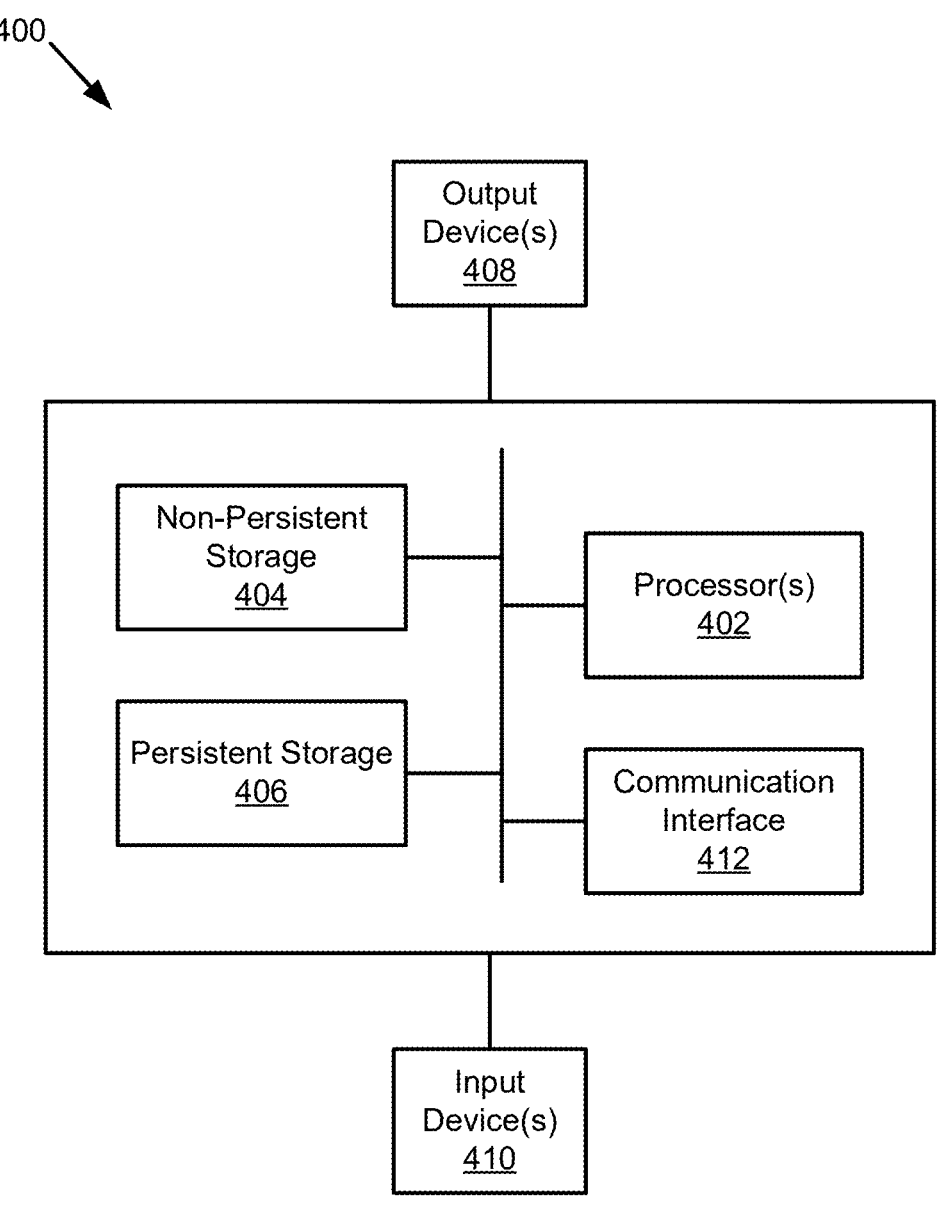
FIG. 4 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

Fast Identity Online (FIDO) Device Onboard (FDO) device onboarding is a device onboarding scheme/standard/mechanism that is developed by the FIDO Alliance. In general, device onboarding is known as a process of installing secrets and configuration data into a computing device so that the device is able to connect and interact securely with, for example, an Internet of Things (IoT) platform (e.g., a global server, an orchestrator, etc.). Various events may trigger device onboarding to take place, but the most common case is when a device is first "unboxed" and installed. The device connects to a corresponding IoT platform over a communication network, with the intent to establish mutual trust and enter an onboarding dialog.

The traditional FDO "device onboarding" procedure involves a sequential process that starts at a manufacturer and ends at a customer site, which implicitly assumes that a customer will purchase an FDO provisioned device. For example, the traditional FDO procedure works by establishing the ownership of a device (e.g., an enterprise product) during manufacturing, then tracking the transfer(s) of ownership of the device (e.g., via a corresponding ownership voucher (OV)) until the device is finally provisioned and put into service. From this perspective, the FDO device onboarding procedure (or the FDO device onboarding) can be thought of as a device "transfer of ownership" process. In this example, between when the device is manufactured and when the device is first powered on (and given access to the Internet), the device may transfer ownership multiple times, where a structured digital document (e.g., an OV) may be used to transfer digital ownership credentials from a first owner to a second owner without the need to power on the device.

In onboarding, an administrator (e.g., an installer person) may perform the physical installation of a device, where, in an "untrusted installer" model, the device takes no guidance on how to onboard from the installer person who has powered on the device. When the device first powered on, one or more FDO protocols may be invoked and by the protocol cooperation among the device, a new user/owner, and a related rendezvous server (e.g., a network server that acts as a rendezvous point between a newly powered on device and an onboarding service), the device and the new owner may be able to prove themselves to each other (so that the new owner may establish a cryptographic control of the device). When this process is finished, the device may be equipped with credentials supplied by the new owner.

In most cases, an orchestrator (e.g., an edge orchestrator) provides a centralized orchestration for FDO device onboarding (e.g., secure device onboarding, zero touch provisioning of an edge device, etc.) and application deployment. The orchestrator requires a secure connection/connectivity with a corresponding edge device to troubleshoot or diagnose any issues associated with the edge device. For example, a NativeEdge Service Console (e.g., a client-based application (executing on a computing device) that a user may leverage to connect to a NativeEdge platform (e.g., an edge-operations platform that helps organizations securely scale their edge device management operations)) may address the issues of edge devices (or edge compute end-points) one by one. With the help of the Service Console, a user (e.g., an administrator, an operations technician, etc.) may connect to a particular edge device and troubleshoot the issues of that edge device.

However, this becomes a problem in cases where a related edge device is not reachable or secure connectivity between the edge device and the Service Console (or the orchestrator) is not established. In a typical edge estate (or simply an "estate"), the number of edge devices can be more than 300 and, as discussed above, to track/monitor edge devices (and later troubleshoot and resolved their issues), a corresponding user may need to connect (via a separate computing device) each one of the edge devices one at a time, which makes the overall process tedious and cumbersome.

From a different perspective, traditional methods require that Service Console-edge device communication needs to be secure communication and the edge device needs to be always reachable to enable the communication (because otherwise (e.g., when the secure communication is not established) there is no way for the Service Console to find/locate the edge device). To this end, there is a need for seamless troubleshooting support for edge devices (or edge deployments) in case one or more unreachable edge devices exist (e.g., in an edge estate).

Further, in traditional solutions, a Service Console displays connectivity information of all the edge devices in a given edge estate, which makes difficult to obtain issue/failure details of each edge device. To this end, there is a need for an automated diagnostic capability in which an initial failure (associated with an edge device) can be analyzed and possible resolution steps (or fixes) associated with the failure can be provided to a corresponding user (so that the user can act upon accordingly to initiate trouble-shooting of the edge device).

Lastly, in traditional approaches, the Service Console provides an option to an administrator/user to display all the details of an edge device only when there is an established connection between the orchestrator and the edge device. To this end, there is a need for intelligent serviceability of edge devices to facilitate troubleshooting of those devices using an orchestrator.

For at least the reasons discussed above and without requiring resource-intensive efforts (e.g., time, engineering, etc.), a fundamentally different approach/framework is needed (e.g., a framework that addresses the serviceability (e.g., maintenance, troubleshooting, etc.) of edge devices in an edge estate using an orchestrator).

Embodiments disclosed herein relate to methods and systems for managing edge devices. As a result of the processes discussed below, one or more embodiments disclosed herein advantageously ensure that: (i) the framework provides seamless troubleshoot support for edge devices in case one or more unreachable edge devices exist in an edge estate (said another way, the framework provides a solution for intelligent troubleshooting of edge devices in an edge estate, in which once the orchestrator has at least one edge device in a provisioned state (e.g., an accessible edge device), the orchestrator can use that edge device to communicate with all non-accessible edge devices (in the edge estate) via a Layer 2 communication protocol); (ii) the framework provides discovery of edge devices (in an edge estate) using a NativeEdge management protocol (NEMP); (iii) the framework provides an automated diagnostic capability in which an initial failure (associated with an edge device) can be analyzed and possible resolution steps (or fixes) associated with the failure can be provided to a corresponding user (so that the user can act upon accordingly to initiate troubleshooting of the edge device); (iv) the framework enables intelligent serviceability of edge devices to facilitate troubleshooting of those devices using the orchestrator; and (v) challenges in troubleshooting edge devices during secure onboarding, provisioning (e.g., after the secure onboarding of an edge device is complete, installing an operating system (OS) on the edge device so that a user can use the edge device to deploy workloads), and application deployment phases are addressed for a better user experience.

The following describes various embodiments disclosed herein.

FIG. 1.1 shows a diagram of a system (100) in accordance with one or more embodiments disclosed herein. The system (100) includes any number of edge estates (e.g., Estate A (105A), Estate B (105B), etc.) (where each edge estate may include/host any number of edge devices (or clients) (e.g., Edge Estate A (105A) hosts Edge Device A (110A), Edge Device B (110B), and Edge Device C (110C)), a network (130), any number of infrastructure nodes (INs) (e.g., 120), and a manufacturer (122). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the edge devices (e.g., 110A, 110B, etc.), the IN (120), and the network (130) may be (or may include) physical hardware or logical devices, as discussed below. While FIG. 1.1 shows a specific configuration of the system (100), other configurations may be used without departing from the scope of the embodiments disclosed herein. For example, although the edge devices (e.g., 110A, 110B, etc.) and the IN (120) are shown to be operatively connected through a communication network (e.g., 130), the edge devices (e.g., 110A, 110B, etc.) and the IN (120) may be directly connected (e.g., without an intervening communication network).

As yet another example, although the edge devices (e.g., 110A, 110B, etc.) are considered as a first layer of the system (100), one or more edge nodes (not shown) are considered as a second layer of the system (100), and the IN (120) is considered as a third layer of the system (100), the system (100) may include another layer (e.g., a fog layer) in between the second layer and third layer. The fog layer may include one or more "fog" devices, similar to that of edge nodes, in which both the edge nodes and fog devices perform distributed computing and focus on the physical deployment of compute and storage resources in relation to data that is being produced (e.g., the difference is a matter of where those resources are located such as edge computing refers to computational processes being done at or near the "edge" of an IoT environment (e.g., 100), whereas fog computing refers to the network connections between the edge nodes and a cloud (or a cloud environment) (e.g., 120) to extend the cloud closer to the edge of the IoT environment).

As yet another example, in one embodiment, a functional edge region (where the actual functioning happens such as, for example, a user uses an edge device to make a product or to deliver a service), a far edge region (including, at least, compute, storage, and/or network access devices focused on data acquisition and processing), and a near edge region of the system (100) may be co-located in one site/factory, and, in another embodiment, the functional edge and far edge regions may be co-located in one site and the near edge region may represent a cloud environment (or a cloud computing environment). In this example, the near edge region may be far away from the functional edge and far edge regions in which the near edge region may represent a centralized and geographically distant cloud environment (e.g., an environment that is hundreds of miles away from the site).

Further, the functioning of the edge devices (e.g., 110A, 110B, etc.) and the IN (120) is not dependent upon the functioning and/or existence of the other components (e.g., devices) in the system (100). Rather, the edge devices and the IN may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., the edge devices (e.g., 110A, 110B, etc.)). For example, the system may be configured to organize unbounded, continuously generated data into a data stream. The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the edge devices (e.g., 110A, 110B, etc.)) and other computations remotely (e.g., away from the users' site using the IN (120)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of an edge device (described below). The resource may be delivered to the edge device via, for example (but not limited to): conventional installation, a method for streaming, a VM executing on a remote computing device, execution from a removable storage device connected to the edge device (such as universal serial bus (USB) device), etc.

In one or more embodiments, an edge estate (e.g., 105A, 105B, etc.) corresponds to a geographic region in the world, in which the edge estate may represent a zone (e.g., a business operation zone) of an organization.

In one or more embodiments, an edge device (e.g., 110A, 110B, etc.) may include functionality to, e.g.: (i) capture sensory input (e.g., sensor data) in the form of text, audio, video, touch or motion, (ii) collect massive amounts of data at the edge of an IoT network (where, the collected data may be grouped as: (a) data that needs no further action and does not need to be stored, (b) data that should be retained for later analysis and/or record keeping, and (c) data that requires an immediate action/response), (iii) provide to other entities (e.g., edge nodes, the IN (120), etc.), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the edge device may perform other functionalities without departing from the scope of the embodiments disclosed herein.

In one or more embodiments, the edge devices (e.g., 110A, 110B, etc.) may be geographically distributed devices (e.g., user devices, front-end devices, etc.) and may have relatively restricted hardware and/or software resources when compared to the IN (120). As being, for example, a sensing device, each of the edge devices may be adapted to provide monitoring services. For example, an edge device may monitor the state of a scene (e.g., objects disposed in a scene). The monitoring may be performed by obtaining sensor data from sensors that are adapted to obtain information regarding the scene, in which an edge device may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the edge devices (e.g., 110A, 110B, etc.) may be physical or logical computing devices configured for hosting one or more workloads, or for providing a computing environment whereon workloads may be implemented. The edge devices may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the edge devices). The edge devices (e.g., 110A, 110B, etc.) may correspond to computing devices that one or more users use to interact with one or more components of the system (100).

In one or more embodiments, an edge device (e.g., 110A, 110B, etc.) may include any number of applications (and/or content accessible through the applications) that provide computer-implemented services to a user. Applications may be designed and configured to perform one or more functions instantiated by a user of the edge device. In order to provide application services, each application may host similar or different components. The components may be, for example (but not limited to): instances of databases, instances of email servers, etc. Applications may be executed on one or more edge devices as instances of the application.

Applications may vary in different embodiments, but in certain embodiments, applications may be custom developed or commercial (e.g., off-the-shelf) applications that a user desires to execute on an edge device (e.g., 110A, 110B, etc.). In one or more embodiments, applications may be logical entities executed using computing resources of an edge device. For example, applications may be implemented as computer instructions stored on persistent storage of the edge device that when executed by the processor(s) of the edge device, cause the edge device to provide the functionality of the applications described throughout the application.

In one or more embodiments, while performing, for example, one or more operations requested by a user, applications installed on an edge device (e.g., 110A, 110B, etc.) may include functionality to request and use physical and logical resources of the edge device. Applications may also include functionality to use data stored in storage/memory resources of the edge device. The applications may perform other types of functionalities not listed above without departing from the scope of the embodiments disclosed herein. While providing application services to a user, applications may store data that may be relevant to the user in storage/memory resources of the edge device.

In one or more embodiments, to provide services to the users, the edge devices (e.g., 110A, 110B, etc.) may utilize, rely on, or otherwise cooperate with the IN (120). For example, the edge devices may issue requests to the IN to receive responses and interact with various components of the IN. The edge devices may also request data from and/or send data to the IN (for example, the edge devices may transmit information to the IN that allows the IN to perform computations, the results of which are used by the edge devices to provide services to the users). As yet another example, the edge devices may utilize computer-implemented services provided by the IN. When the edge devices interact with the IN, data that is relevant to the edge devices may be stored (temporarily or permanently) in the IN.

In one or more embodiments, an edge device (e.g., 110A, 110B, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the edge devices (e.g., 110A, 110B, etc.) may provide computer-implemented services to users (and/or other computing devices). The edge devices may provide any number and any type of computer-implemented services. To provide computer-implemented services, an edge device may include a collection of physical components (e.g., processing resources, storage/memory resources, networking resources, etc.) configured to perform operations of the edge device and/or otherwise execute a collection of logical components (e.g., virtualization resources) of the edge device.

In one or more embodiments, a processing resource (not shown) may refer to a measurable quantity of a processing-relevant resource type, which can be requested, allocated, and consumed. A processing-relevant resource type may encompass a physical device (i.e., hardware), logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the edge devices (e.g., 110A, 110B, etc.) provide computer-implemented services to users, the edge devices may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the edge devices (e.g., 110A, 110B, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface an edge device with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the edge device and the external entities. For example, a networking resource may enable the edge device to be operatively connected, via Ethernet, using a TCP protocol to form a "network fabric", and may enable the communication of data between the edge device and the external entities. In one or more embodiments, each edge device may be given a unique identifier (e.g., an Internet Protocol (IP) address) to be used when utilizing the above-mentioned protocols.

Further, a networking resource, when using a certain protocol or a variant thereof, may support streamlined access to storage/memory media of other edge devices (e.g., 110A, 110B, etc.). For example, when utilizing remote direct memory access (RDMA) to access data on another edge device, it may not be necessary to interact with the logical components of that edge device. Rather, when using RDMA, it may be possible for the networking resource to interact with the physical components of that edge device to retrieve and/or transmit data, thereby avoiding any higher-level processing by the logical components executing on that edge device.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of an edge device (e.g., 110A, 110B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the edge device that when executed by processing resources of the edge device, cause the edge device to provide the functionality of the hypervisor.

In one or more embodiments, an edge device (e.g., 110A, 110B, etc.) may be, for example (but not limited to): a physical computing device, a smartphone, a tablet, a wearable, a gadget, a closed-circuit television (CCTV) camera, a music player, a game controller, etc. Different edge devices may have different computational capabilities. In one or more embodiments, Edge Device A (110A) may have 16 gigabytes (GB) of dynamic RAM (DRAM) and 1 CPU with 12 cores, whereas Edge Device B (110B) may have 8 GB of PMEM and 1 CPU with 16 cores. Other different computational capabilities of the edge devices not listed above may also be taken into account without departing from the scope of the embodiments disclosed herein.

Further, in one or more embodiments, an edge device (e.g., 110A, 110B, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the edge device described throughout the application.

Alternatively, in one or more embodiments, the edge device (e.g., 110A, 110B, etc.) may be implemented as a logical device (e.g., a VM). The logical device may utilize the computing resources of any number of computing devices to provide the functionality of the edge device described throughout this application.

In one or more embodiments, users (e.g., customers, administrators, people, etc.) may interact with (or operate) the edge devices (e.g., 110A, 110B, etc.) in order to perform work-related tasks (e.g., production workloads). In one or more embodiments, the accessibility of users to the edge devices may depend on a regulation set by an administrator of the edge devices. To this end, each user may have a personalized user account that may, for example, grant access to certain data, applications, and computing resources of the edge devices. This may be realized by implementing the virtualization technology. In one or more embodiments, an administrator may be a user with permission (e.g., a user that has root-level access) to make changes on the edge devices that will affect other users of the edge devices.

In one or more embodiments, for example, a user may be automatically directed to a login screen of an edge device when the user connected to that edge device. Once the login screen of the edge device is displayed, the user may enter credentials (e.g., username, password, etc.) of the user on the login screen. The login screen may be a graphical user interface (GUI) generated by a visualization module (not shown) of the edge device. In one or more embodiments, the visualization module may be implemented in hardware (e.g., any number of integrated circuits for processing computer readable instructions), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, through the concept of edge computing, some of the computational load may be moved towards to the edge of the network to harness computational capabilities (of the edge nodes) that may be untapped, which are located closer (for example, one-hop away from an edge device (e.g., 110A, 110B, etc.)) to users to reduce possible network latency (for example, for mission critical and/or latency-sensitive applications).

In one or more embodiments, to be able to communicate with the IN (120) (e.g., an IoT hub), an edge device (e.g.,

110A, 110B, etc.) and/or an edge node may register to the IoT hub. For example, to be able to register/connect to the IoT hub, an edge device may make an application programming interface (API) call to the IoT hub. Based on receiving an API call from the edge device, the IoT hub may send a connection string (which has a predetermined length) to the edge device. The edge device may then use the connection string to connect to the IoT hub.

In one or more embodiments, an edge node may be, for example (but not limited to): a physical computing device, a router, a switch, a network device with routing or switching functionality, a small/macro base station, a small enclosure (with several servers and some storage) installed atop of a wind turbine to collect and process data, etc.

In one or more embodiments, one or more edge nodes may be geographically distributed so that computing may be performed closer to the source of data (e.g., edge devices (e.g., 110A, 110B, etc.) where data is generated) to improve a service that is delivered to a user of an edge device. In one or more embodiments, an edge node (via its collector (not shown)) may monitor operational states of the edge devices (e.g., 110A, 110B, etc.). The operational state of an edge device may correspond to the ability of the edge device to perform predetermined functionalities (e.g., obtaining information regarding a scene associated with an edge device).

In one or more embodiments, the connection string may be a data structure that includes one or more parameters (e.g., location information of the IN (120), authentication information associated with the IN (120), etc.) required for an entity to connect to the IoT hub (or any component). In one or more embodiments, the corresponding component of the IoT hub may be offline for, for example, a system maintenance to configure and upgrade an OS. While the corresponding component is offline, the connection between an edge device (e.g., 110A, 110B, etc.) and the corresponding component may be disconnected. When the corresponding component comes back online, the edge device may reconnect to the corresponding component using the same connection string.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more edge devices (e.g., 110A, 110B, etc.) to generate additional data that is derived from the obtained data without experiencing any middleware and hardware limitations; (iii) provide meaningful information (e.g., a response) back to the corresponding edge devices; (iv) filter data (e.g., received from an edge device) before pushing the data (and/or the derived data) to a database (not shown) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the edge devices; (viii) provide robust security features to the edge devices and make sure that a minimum level of service is always provided to a user of an edge devices; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the IN may split up a request (e.g., an operation, a task, an activity, etc.) with another IN, coordinating its efforts to complete the request more efficiently than if the IN had been responsible for completing the request); (xi) provide software-defined data protection for the edge devices (e.g., 110A, 110B, etc.); (xii) provide automated data discovery, protection, management, and recovery operations for the edge devices; (xiii) monitor operational states of the edge devices; (xiv) regularly back up configuration information of the edge devices to the database; (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the edge devices and/or database; (xvii) provide data deduplication; (xviii) orchestrate data protection through one or more GUIs; (xix) empower data owners (e.g., users of the edge devices) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, edge devices) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more edge devices (e.g., receiving information from the edge devices regarding changes in the operation of the edge devices) to improve their operations (e.g., improve the quality of data being generated, decrease the computing resources cost of generating data, etc.). In one or more embodiments, in order to read, write, or store data, the IN (120) may communicate with, for example, the database and/or other storage devices in the system (100).

As described above, the IN (120) may be capable of providing a range of functionalities/services to the users of the edge devices (e.g., 110A, 110B, etc.). However, not all of the users may be allowed to receive all of the services. To manage the services provided to the users of the edge devices, a system (e.g., a service manager) in accordance with embodiments disclosed herein may manage the operation of a network (e.g., 130), in which the edge devices are operably connected to the IN. Specifically, the service manager (i) may identify services to be provided by the IN (for example, based on the number of users using the edge devices) and (ii) may limit communications of the edge devices to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication (BW)). By doing so, (i) computer-implemented services provided to the users of the edge devices (e.g., 110A, 110B, etc.) may be granularly configured without modifying the operation(s) of the edge devices and (ii) the overhead for managing the services of the edge devices may be reduced by not requiring modification of the operation(s) of the edge devices directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other INs may provide a second computer-implemented service cooperatively (e.g., each of the multiple other INs may provide similar and/or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the IN and/or otherwise execute a collection of logical components/resources (discussed above) of the IN.

In one or more embodiments, a resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc. Different resource sets, or portions thereof, from the same or different INs may be aggregated (e.g., caused to operate as a computing device) to instantiate a composed IN having at least one resource set from each set of the three resource set model.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

In one or more embodiments, a hardware resource set (e.g., of an IN) may include (or specify), for example (but not limited to): a configurable CPU option (e.g., a valid/legitimate vCPU count per-IN option), a minimum user count per-IN, a maximum user count per-IN, a configurable network resource option (e.g., enabling/disabling single-root input/output virtualization (SR-IOV) for specific INs), a configurable memory option (e.g., maximum and minimum memory per-IN), a configurable GPU option (e.g., allowable scheduling policy and/or vGPU count combinations per-IN), a configurable DPU option (e.g., legitimacy of disabling inter-integrated circuit (I2C) for various INs), a configurable storage space option (e.g., a list of disk cloning technologies across all INs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IN, a wake on LAN support configuration (e.g., supported/enabled, not supported/disabled, etc.), a swap space configuration per-IN, a reserved memory configuration (e.g., as a percentage of configured memory such as 0-100%), a memory ballooning configuration (e.g., enabled, disabled, etc.), a vGPU count per-IN, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), etc.

In one or more embodiments, the IN (120) may host an orchestrator (125). Said another way, the orchestrator (125) is demonstrated as a part of the IN (120) (e.g., as deployed to the IN (120)); however, embodiments disclosed herein are not limited as such. In the embodiments of the present disclosure, the orchestrator (125) may be demonstrated as a separate entity from the IN (120).

In one or more embodiments, as being a single pane of glass (e.g., as being a single source of truth in an organization), the orchestrator (125) may include functionality to, e.g.: (i) provide seamless troubleshoot support for edge devices (e.g., 110A, 110B, etc.) in case one or more unreachable edge devices exist in an edge estate (e.g., 105A, 105B, etc.), especially when at least one of the edge devices (of the edge estate) is in a provisioned state (or accessible) (so that the orchestrator may use that edge device (and a Layer 2 communication protocol) to communicate with all non-accessible edge devices in the edge estate); (ii) enable/provide diagnostics of unreachable edge devices in an edge estate (e.g., providing an automated diagnostics capability where a failure (associated with an edge device) may be analyzed and possible resolution steps (or fixes) associated with the failure may be provided to a corresponding user (so that the user may act upon accordingly to initiate troubleshooting of the edge device)); (iii) enable/provide discovery of edge devices in an edge estate using NEMP; (iv) provide, via its visualizer (not shown), a set of options (e.g., troubleshooting options, resolution steps, etc.) to the user to identify one or more failed edge devices (e.g., non-accessible edge devices, unhealthy edge devices, etc.) in an edge estate and, based on the user's selection(s) (e.g., with respect to at least one of the identified "failed" edge devices), implement user-selected option(s) to resolve the failure of each identified edge device (once the failure of, for example, Edge Device C (110C) is resolved, the orchestrator may send, via its visualizer, an informative notification to the user to indicate that the failure of Edge Device C is resolved (or not resolved)); (v) manually set an edge device's (e.g., an edge endpoint's) IP address when the Dynamic Host Configuration Protocol (DHCP) is not available; (vi) manually set a related rendezvous server's IP address to onboard a relevant edge device, in case Domain Name System (DNS) resolution is not available; (vii) specify a network time protocol (NTP) server and set the current time; (viii) provide serviceability support for all the edge devices in a given edge estate; and/or (ix) support performing a batch configuration across multiple edge devices.

Further, as being a control plane, the orchestrator (125) may include functionality to, e.g.: (i) in conjunction with a global manufacturing service (GMS) module (not shown) and a voucher management service (VMS) module (not shown) hosted by the system (100), support secure onboarding and provisioning of the edge devices (e.g., 110A, 110B, etc.) in light of the FDO protocol (including the FDO device initialization (DI) process/protocol); and/or (ii) after the FDO DI process is completed for an edge device, receive one or more OVs from a user of the edge device.

In one or more embodiments, a failure (e.g., an issue, a problem, etc.) associated with an edge device (e.g., 110A, 110B, etc.) may be, for example (but not limited to): an edge device is not reachable (e.g., because the edge device is not securely connected to the orchestrator (125), because the edge device is down/offline, because the edge device has no network configuration, etc.); during the secure onboarding of an edge device, the edge device is not turning on; after the secure onboarding and provisioning of an edge device are completed (which means the edge device's OS is installed), the edge device is not turning on; an OS of an edge device is not operating; no IP address is configured for an edge device (e.g., once an IP address is configured, the FDO protocol can be initiated); an onboarding issue (e.g., Edge Device D's onboarding is failed); a provisioning issue (e.g., Edge Device E's provisioning is failed); a workload deployment issue (e.g., Workload T could not be deployed to Edge Device F); Edge Device A does not have a configured rendezvous server to connect; downloading a provisioning template related to an OS of Edge Device C is failed; Edge Device A is experiencing a transfer ownership protocol 2 (TO2) related issue (e.g., because of an OV mismatch or a missing OV); an intermittent network issue occurred in the network (130); etc.

In one or more embodiments, a resolution step may be (or may specify), for example (but not limited to): configuring an IP address for a non-reachable edge device (e.g., 110A, 110B, etc.); manually setting an edge device's IP address when the DHCP is not available; manually setting a related rendezvous server's IP address to onboard a relevant edge device, in case DNS resolution is not available; specifying an NTP server and setting the current time; etc.

In one or more embodiments, the visualizer (e.g., a GUI, an API, a programmatic interface, and/or a communication channel of the orchestrator (125)) may initiate, for example, displaying of: (i) identified health status of each edge device in an edge estate (e.g., Edge Device B is not reachable (e.g., unhealthy, failed, offline, etc.), Edge Device C is reachable (e.g., healthy, online, etc.), etc.) (so that a related user may dynamically (and holistically) infer what is happening in each edge estate hosted by the system (100)); (ii) one or more root causes (or reasons) indicating why an unhealthy edge device is unhealthy and why a healthy edge device is healthy (e.g., Edge Device B is not reachable because Edge Device B has no network configuration, Edge Device A is not reachable because Edge Device A is experiencing a TO2 related issue, etc.); (iii) one or more resolution steps (or action items (as a set of options/recommendations to support batch processing of user-selected configurations)) so that the user may act on (e.g., indirectly troubleshoot) a failed edge device (in an edge estate) by simply selecting (or clicking on) an option; (iv) an informative notification (after a user-selected option is implemented) to the user to indicate that the failure of the related edge device is resolved (or not resolved); (v) scheduled workloads on each edge device; (vi) alerts/notifications generated (e.g., when resource utilization thresholds are exceeded) for a specific edge device; (vii) real-time device health indicators (e.g., battery status, CPU usage, DPU usage, memory usage, network connectivity, etc.) of each edge device; and/or (viii) a workload queue (of a related edge device) indicating scheduled, pending, or cancelled workloads to indicate availability of the edge device.

In one or more embodiments, for example, (i) each data item (e.g., identified health status of an edge device, a generated alert, etc.) may be displayed (e.g., highlighted, visually indicated, etc.) with a different color (e.g., red color tones may represent a negative overall health status of an edge device, green color tones may represent a positive overall health status of an edge device, etc.), and (ii) one or more useful insights/recommendations with respect to the overall health status of an edge device may be displayed in a separate window(s) on the visualizer to assist the user while managing the overall health status of the edge device (e.g., for a better user experience, to help the user with respect to understanding the benefits and trade-offs of selecting different troubleshooting options, etc.).

Further, the visualizer may include functionality to, e.g.: (i) obtain (or receive) data (e.g., any type and/or quantity of input) from any source (e.g., a user via an edge device) (and, if necessary, aggregate the data); (ii) based on (i) and by employing a set of linear, non-linear, and/or ML models, analyze, for example, a query to derive additional data; (iii) encompass hardware and/or software components and functionalities provided by the orchestrator (125) to operate as a service over the network (e.g., 130) so that the visualizer may be used externally; (iv) employ a set of subroutine definitions, protocols, and/or hardware/software components for enabling/facilitating communications between, for example, the orchestrator (125) and external entities (e.g., edge devices, administrators, etc.); (v) by generating one or more visual elements, allow an administrator to, at least, interact with a user of a corresponding edge device; (vi) receive a customer/user profile of a customer and display the customer profile to an administrator (e.g., for monitoring and/or performance evaluation); (vii) concurrently display one or more separate windows, for example, on its GUI; and/or (viii) generate visualizations of the method illustrated in FIGS. 3.1-3.3.

As used herein, "unhealthy" may refer to a compromised health state (e.g., an unhealthy state), indicating a corresponding entity (e.g., a hardware component, an edge device, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, the FDO DI protocol may be a non-normative protocol that executes within the manufacturer (122) when a new computing device (e.g., a new edge device) is built/manufactured. The DI protocol's function is to embed the ownership and manufacturing credentials (e.g., initialization keys, FDO credentials, etc.) into the newly generated device's restricted operating environment (e.g., the device's trusted platform module (TPM)). This prepares the device and establishes the first chain for generating a corresponding OV, with which to transfer ownership of the device (e.g., before the device can be used for FDO onboarding, the device must be provisioned to embed the ownership and manufacturing credentials into the device). Said another way, the output of employing the DI protocol is an OV, which can be used to establish the device ownership during a TO2.

The DI protocol assumes that the protocol will be executed in a safe "manufacturing" environment and, because of that, the DI protocol employs a trust on first use (TOFU) model. Further, the DI protocol ensures that an initial "FDO" OV includes a means to trust to the device (via, for example, an embedded device certificate chain or Intel® Enhanced Privacy ID (EPID)). As used herein, an embedded device certificate chain or Intel® EPID may be used for attestation during FDO device onboarding. For example, attestation via Intel® EPID associates only a group identify with transfer of ownership, without allowing device correlation to a rendezvous server or to anyone monitoring Internet traffic at the rendezvous server. As yet another example, Intel® EPID may be used to prove the manufacturer to a prospective owner/user without identifying the device.

In one or more embodiments, in conjunction with a controller (not shown) of an edge device (e.g., 110A, 110B, etc.), a DI agent (not shown) of the edge device may prepare the edge device for the FDO device onboarding. To this end, the DI agent may employ a transfer ownership protocol 0 (TO0), where the DI agent may indicate its intention and prove it is capable of taking control of the edge device's FDO device onboarding (for example, based on the edge device's current globally unique identifier (GUID)). After the TO0 is applied, the DI agent may notify the controller (of the edge device) that the TO0 is completed (and then, the edge device may be rebooted).

Thereafter, the controller (in conjunction with a TPM of the edge device) may apply a transfer ownership protocol 1 (TO1) (which is a mirror image of the TO0, occurring at the edge device) and the TO2 (where, after mutual trust is proven (via device attestation and corresponding OV) and a secure channel is established between the controller (of the edge device) and the orchestrator (125), key-value pairs are exchanged to provision secrets, data, and/or commands) to complete secure device onboarding of the edge device. After that, the controller (of the edge device) may (i) replace all FDO credentials, (ii) build a hash-based message authentication code (HMAC) to allow users to generate, for example, a replacement ownership proxy to be used for resale, and (iii) replace the edge device's current GUID (which is for a single FDO transfer of ownership only) so that the edge device has no memory of that GUID.

Additional details of the orchestrator (125) are described below in reference to FIG. 1.2. One of ordinary skill will appreciate that the orchestrator (125) may perform other functionalities without departing from the scope of the embodiments disclosed herein. The orchestrator (125) may be implemented using hardware (e.g., a physical device including circuitry), software, or any combination thereof.

Separately, one of ordinary skill will appreciate that the IN (120) may perform other functionalities without departing from the scope of the embodiments disclosed herein. In one or more embodiments, the IN (120) may be configured to perform (in conjunction with other INs) all, or a portion, of the functionalities described in FIGS. 3.1-3.3.

In one or more embodiments, the IN (120) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to an edge device (e.g., 110A, 110B, etc.), the IN (120) may also be implemented as a logical device.

In one or more embodiments, the system (100) may also include a database (not shown). The database may provide long-term, durable, high read/write throughput data storage/protection with near-infinite scale and low-cost. The database may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of an edge device (e.g., 110B)); a protocol type associated with a port number; computing resource details (including details of hardware components and/or software components) and an IP address of an IN (e.g., 120) hosting an application where a specific request is processed; an identifier of an application (e.g., that is deployed by the manufacturer (122) to the database); information with respect to historical metadata (e.g., system logs, applications logs, telemetry data including past and present device usage of one or more computing devices in the system (100), etc.); computing resource details and an IP address of an edge device that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters; an identifier of a sensor; a product identifier of an edge device (e.g., 110A); a type of an edge device; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with an edge device; a number of each type of a set of assets protected by an IN (e.g., 120); a size of each of the set of assets protected; a number of each type of a set of data protection policies implemented by a user; configuration information associated with an IN (e.g., 120) (to manage security, network traffic, network access, or any other function/operation performed by the IN); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set of an IN (e.g., 120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); information regarding an administrator (e.g., a high priority trusted administrator, a low priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by the manufacturer (122) (e.g., a single data protection policy should not protect more than 100 assets; for a dynamic NAS, maximum one billion files can be protected per day, etc.); one or more device state paths corresponding to an edge device; an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, metadata (e.g., system logs, application logs, etc.) may be obtained (or dynamically fetched) as they become available (e.g., with no user manual intervention), or by an analyzer (not shown) of an IN (e.g., 120) polling a corresponding edge device (e.g., 110C) (by making schedule-driven/periodic API calls to the edge device without affecting the edge device's ongoing production workloads) for newer metadata. Based on receiving the API calls from the analyzer, the edge device may allow the analyzer to obtain the metadata.

In one or more embodiments, the metadata may be obtained (or streamed) continuously as they generated, or they may be obtained in batches, for example, in scenarios where (i) the analyzer receives a metadata analysis request (or a health check request for an edge device), (ii) another IN of the system (100) accumulates the metadata and provides them to the analyzer at fixed time intervals, or (iii) the database stores the metadata and notify the analyzer to access the metadata from the database. In one or more embodiments, metadata may be access-protected for transmission from a corresponding edge device (e.g., 110A) to the analyzer, e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by the manufacturer (122)) and/or by the administrators based on, for example, newer (e.g., updated) versions of SLAs. The unstructured and/or structured data may also be updated when, for example (but not limited to): newer system logs are received, a state of an IN (e.g., 120) is changed, etc.

While the database has been illustrated and described as including a limited number and type of data, the database may store additional, less, and/or different data without departing from the scope of the embodiments disclosed herein. One of ordinary skill will appreciate that the database may perform other functionalities without departing from the scope of the embodiments disclosed herein.

In one or more embodiments, as being a trusted facility/site, the manufacturer (122) may be part of a supply chain route (that may be traversed by an enterprise product), in which the supply chain route may outline a sequence of trusted sites through which the enterprise product transitions during its lifetime.

In one or more embodiments, the manufacturer (122) may reference a trusted facility where a supplier of an enterprise product (e.g., a physical product such as an edge device, a logical product such as a software program or an application, etc.) may manufacture the enterprise product in part or in entirety. Manufacturing of an enterprise product may include one or more steps/stages, for example (but not limited to): steps of a developer/administrator flow of an application; steps of generating an OV (based on the credentials specified in the DI protocol (where the OV may not be stored in the corresponding edge device; instead, the OV may be transmitted along the supply chain route to mirror the edge device's progress); steps of initial provisioning of an edge device; steps of generating a public and private key pair for an edge device (before shipping the edge device to a user/customer), where the public key of the key pair is embedded into a corresponding OV; manufacturing of chassis and front panel parts; subassembly of chassis parts to obtain a chassis; integration of a chassis and front panel parts to obtain a chassis enclosure; procurement of a power supply and/or cables and/or a backplane; integration of a power supply and/or cables and/or a backplane into a chassis enclosure; procurement of a baseboard and integration thereof into a chassis enclosure; procurement of one or more expansion cards and integration thereof into a chassis enclosure; procurement of one or more storage devices and integration thereof into a chassis enclosure; procurement of computer processors (e.g., CPUs, DPUs, etc.) as well as computer memory and integration thereof into a chassis enclosure to obtain a fully-assembled enterprise product; installation of an OS, zero or more software applications, and/or firmware onto a fully-assembled enterprise product to obtain a fully-integrated enterprise product; etc.

In one or more embodiments, the aforementioned enterprise product manufacturing steps may be performed across one or more manufacturers. Further, the manufacturer (122) may include functionality to service, upgrade, troubleshoot, test, package, and/or distribute various different enterprise products. One of ordinary skill will appreciate that the manufacturer (122) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., edge devices, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the edge devices and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1.1 shows a configuration of components, other system configurations may be used without departing from the scope of the embodiments disclosed herein.

Turning now to FIG. 1.2, FIG. 1.2 shows a diagram of a part of the system (shown in FIG. 1.1) in accordance with one or more embodiments disclosed herein. The embodiment shown in FIG. 1.2 may illustrate an example scenario in which Edge Device A (110A), Edge Device B (110B), and Edge Device C (110C) form Estate A (105A) (in a logical way). In this scenario (which is explanatory purposes only and not intended to limit the scope disclosed herein), assume that Edge Device A (110A) is reachable (by the orchestrator (125)) (represented by the half dash two-headed arrow), and Edge Device B (110B) and Edge Device C (110C) are non-reachable (by the orchestrator (125)) (represented by the dash dot two-headed arrows).

In the aforementioned scenario, a relevant user may use the orchestrator (125) to understand why Edge Devices B-C are non-reachable (e.g., failed, unhealthy, etc.) and troubleshoot both edge devices to make them reachable again. To this end, the orchestrator (125) leverages Edge Device A (as the "connected" edge device in Estate A) to troubleshoot all the edge devices deployed to Estate A (said another way, in this scenario, the orchestrator may use Edge Device A (as a bridge) to troubleshoot issues associated with Edge Devices B-C). To make this happen, each edge device in Estate A needs to be connected to each other over a Layer 2 network layer (e.g., a network layer used to transfer data between nodes/devices on the same LAN) so that, using Layer 2 communication (or a Layer 2 communication protocol) (where Edge Devices A-C are connected to each other over a LAN cable) and via a raw socket (e.g., a type of socket that allows access to the underlying transport provider), the orchestrator (125) may connect to all edge devices (reachable and non-reachable) in Estate A.

The use of Layer 2 communication protocol (over a raw socket) enables the orchestrator (125) to connect to a non-reachable edge device (e.g., Edge Device B) using a corresponding MAC address (which may be a user-provided "destination" MAC address) of the non-reachable edge device, without needing an active network configuration for the non-reachable edge device (e.g., without requiring any IP network pre-configuration to communicate with Edge Device B). By this way, for example, the user may realize that (via the visualizer of the orchestrator (125)) there is no IP address configured for Edge Device B. Based on that, the user may direct the orchestrator (125) to configure an IP address for Edge Device B (to make the Edge Device B reachable).

Turning now to FIG. 2.1, FIG. 2.1 shows an example "orchestrator-edge device communication" scenario in accordance with one or more embodiments disclosed herein. The example scenario, illustrated in FIG. 2.1 and described below, is explanatory purposes only and not intended to limit the scope disclosed herein.

Hereinafter, consider the following example scenario that illustrates (i) orchestrator-edge device communication, and (ii) a session management procedure between a reachable (e.g., provisioned, healthy, etc.) edge device (e.g., Edge Device Y that is part of Estate A) and a non-reachable (e.g., unprovisioned, unhealthy, etc.) edge device (e.g., Edge Device X that is part of Estate A) to troubleshoot Edge Device X.

1. The orchestrator (e.g., 125, FIG. 1.1) submits/sends a device debug request to Edge Device Y, where the device debug request specifies at least a type of a user-requested event (e.g., configure an IP address for Edge Device X, obtain configuration details of a related rendezvous server, configure the rendezvous server to onboard Edge Device X, etc.)

2. Upon receiving the device debug request, Edge Device Y (using the Layer 2 communication protocol (over a raw socket)) sends a session management request to Edge Device X (to initiate troubleshooting of Edge Device X), in which the session management request specifies at least an identifier of a unique session (e.g., a session ID) established between Edge Device X and Edge Device Y (where the session ID will be used to represent the established session), a sequence number (where (i) a request always gets a new sequence number and a related response (see "3") uses the same sequence number while responding to that request, and (ii) the sequence number will be randomly generated), and a message (which specifies at least the event type received from the orchestrator (for troubleshooting and inferring the device health status/state of Edge Device X))

3. In response to the session management request, Edge Device X (using the Layer 2 communication protocol (over the raw socket)) sends a session management response to Edge Device Y, in which the session management response specifies at least the session ID, the sequence number, a state of Edge Device X (e.g., onboarding, secure zero touch provisioning (SZTP), failed onboarding, etc.), and the message (which specifies at least the event type received from the orchestrator)

4. In response to the device debug request, Edge Device Y sends a device debug response, in which the device debug response specifies at least the state of Edge Device X and the event type (thereafter, the orchestrator displays the latest state of Edge Device X to a related user so that the user can take necessary actions accordingly (e.g., the user selects a resolution step (e.g., reconfigure a related rendezvous server's IP address configuration) recommended by the orchestrator, where the orchestrator applies the user-selected resolution step to make Edge Device X provisioned/reachable))

FIGS. 2.2-2.3 show an example session establishment scenario between edge devices in accordance with one or more embodiments disclosed herein. The example scenario, illustrated in FIGS. 2.2-2.3 and described below, is explanatory purposes only and not intended to limit the scope disclosed herein.

Hereinafter, consider the following example scenario that illustrates (i) orchestrator-edge device communication, and (ii) a session establishment procedure between a reachable (e.g., provisioned, healthy, etc.) edge device (e.g., Edge Device Y that is part of Estate A) and a non-reachable (e.g., unprovisioned, unhealthy, etc.) edge device (e.g., Edge Device X that is part of Estate A) to troubleshoot Edge Device X.

Turning now to FIG. 2.2:

1. Edge Device X submits/sends a first discover device message to Edge Device Y, in which the first discover device message (i) is a multicast message sent from each edge device hosted by Estate A so that each edge device can advertise itself and try to establish a connection with another edge device in Estate A, and (ii) specifies at least a sequence number, a device service tag (or a serial number) of Edge Device X, and a state of Edge Device X (e.g., onboarding, unprovisioned, etc.)

2. In response to the first discover device message, Edge Device Y sends a second discover device message to Edge Device X, in which the second discover device message (i) is a multicast message sent from each edge device hosted by Estate A so that each edge device can advertise itself and try to establish a connection with another edge device in Estate A, and (ii) specifies at least the sequence number, a device service tag (or a serial number) of Edge Device Y, and a state of Edge Device Y (e.g., onboarding completed, provisioned, etc.)

Turning now to FIG. 2.3 (where steps "3" and "4" represents an authentication mechanism, which is a mechanism to authenticate Edge Device X and Edge Device Y mutually, and to establish an encrypted/secure connection between Edge Device X and Edge Device Y (to enable the Layer 2 communication protocol (over the raw socket))):

3. Edge Device X submits an authentication request to Edge Device Y to established the secure connection between Edge Device X and Edge Device Y 4. In response to the authentication request, Edge Device Y sends an authentication response to Edge Device X to indicate that the secure connection is established 5. Edge Device Y sends (using the Layer 2 communication protocol (over the raw socket)) a session create/generate request to Edge Device X (so that (i) Edge Device Y will be responsible for Edge Device X (not any other "provisioned" edge device in Estate A) and (ii) Edge Device X will not connect to any other "provisioned" edge device in Estate A for troubleshooting purposes), in which the session create request specifies at least a second sequence number and a session ID 6. In response to the session create request, Edge Device X sends (using the Layer 2 communication protocol (over the raw socket)) a session create response to Edge Device Y, in which the session create response specifies at least the device service tag of Edge Device X, the session ID, the second sequence number, the state of Edge Device X (e.g., onboarding, SZTP, etc.), a version of an OS executing on Edge Device X, and a version of firmware executing on Edge Device X 7. Edge Device Y sends a device information event message to the orchestrator, in which the device information event message specifies at least the device service tag of Edge Device X, the state of Edge Device X (e.g., onboarding, SZTP, etc.), the version of the OS executing on Edge Device X, and the version of the firmware executing on Edge Device X (thereafter, (i) Edge Device Y sends a session end request to Edge Device X in order to end the session and release the session ID, and (ii) upon receiving the session end request, Edge Device X sends a session end response to Edge Device Y to indicate that the session is ended/terminated)

FIGS. 3.1-3.3 show a method for managing edge devices in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3.1, the method shown in FIG. 3.1 may be executed by, for example, the above-discussed orchestrator (e.g., 125, FIG. 1.1). Other components of the system (100) illustrated in FIG. 1.1 may also execute all or part of the method shown in FIG. 3.1 without departing from the scope of the embodiments disclosed herein.

In Step 300, the orchestrator receives an "edge device status inquiry" request from a requesting entity (e.g., a user of an edge device, a user terminal, etc.) that wants to know the latest device health status of each edge device (e.g., 110A, 110B, etc.) that is part of an edge estate (e.g., 105A).

In response to receiving the request, as part of that request, and/or in any other manner (e.g., before initiating any computation with respect to the request), the orchestrator identifies, based on connectivity of each edge device (that is inferred from an initial list of all edge devices (hosted by the system (e.g., 100, FIG. 1.1))), (i) one or more accessible edge devices (e.g., a set of accessible edge devices) and (ii) one or more non-accessible edge devices (e.g., a set of non-accessible edge devices) in the edge estate.

In one or more embodiments, the orchestrator may generate the initial list based on a corresponding OV (uploaded to the orchestrator) of each edge device, in which the initial list may specify, for example (but not limited to): "Edge Device A: waiting to onboard (non-accessible)", "Edge Device B: provisioned (accessible/connected)", "Edge Device C: non-accessible", etc.

In Step 302, based on the identifying (in Step 300) and as part of a user involved diagnostics workflow, the orchestrator determines that, for example, a first edge device is accessible (meaning that a secure connection between the first edge device and the orchestrator is established) and a second edge device is non-accessible (due to a failure/issue (described above in reference to FIG. 1.1) associated with the second edge device). In Step 304, based on the determining (in Step 302), the orchestrator sends a device debug request (related to the second edge device) to the first edge device (see FIG. 3.3), in which the first edge device is used as a bridge (between the orchestrator and the second edge device) to troubleshoot the issue(s) (associated with the second edge device).

As indicated above, the first edge device is used as a bridge because the first and second edge devices communicate with each other using a Layer 2 communication protocol (which is implemented on a raw socket), without requiring a pre-determined IP network configuration to communicate with each other. Further, using the Layer 2 communication protocol (over the raw socket), the first edge device communicates with the second edge device based on a MAC address of the second edge device, in which at least the first and second edge devices (of the edge estate) are connected to each other over a "physical" LAN cable (as being a part of the same network segment).

In Step 306, in response to the device debug request, the orchestrator receives metadata (associated with the second edge device) from the first edge device. In one or more embodiments, the metadata may specify, for example (but not limited to): failure/issue details associated with the second edge device (e.g., the second edge device does not have a network configuration, a secure onboarding (or an FDO onboarding) of the second edge device is failed, provisioning of the second edge device is failed, the second edge device is offline, no secure connection is established between the second edge device and the orchestrator, the second edge device is experiencing an OS related issue, the second edge device cannot connect to a related rendezvous server, etc.), a network connection status of the second edge device, an error message related to the second edge device (e.g., TO1 is failed, TO2 is failed, the second edge devices is experiencing an FDO failure, etc.), etc.

In Step 308, by employing a set of linear, non-linear, and/or ML models, the orchestrator analyzes the metadata to generate a set of solutions (e.g., resolution steps) to resolve the issue(s) associated with the second edge device. In one or more embodiments, the set of solutions may include (or specify), for example (but not limited to): perform an IP address configuration for the second edge device, re-configure a related rendezvous server, update the related rendezvous server's IP address, perform a SZTP, etc.

In Step 310, via its visualizer (more specifically, via a GUI of the visualizer), the orchestrator provides, at least, a device health status of the first edge device, the issue, and the set of solutions to the user (that sent the "edge device status inquiry" request in Step 300) to notify the user about a current status of the first edge device and a current status (e.g., a first status) of the second edge device.

After the providing (in Step 310), in Step 312, the orchestrator receives, via the GUI, a user-selected solution (from the set of solutions) to be applied on a corresponding computing device (e.g., the second edge device (e.g., performing an IP address configuration for the second edge device), a related rendezvous server (e.g., re-configuring the related rendezvous server), etc.). As indicated, the computing device may be the second edge device or another computing device that is associated with the second edge device.

In Step 314, the orchestrator applies the user-selected solution on the computing device and automatically refreshes the connectivity of the second edge device (and the remaining edge devices of the edge estate) in order to keep the user updated with respect to the latest device health status of each edge device.

Turning now to FIG. 3.2, the method shown in FIG. 3.2 may be executed by, for example, the above-discussed orchestrator. Other components of the system (100) illustrated in FIG. 1.1 may also execute all or part of the method shown in FIG. 3.2 without departing from the scope of the embodiments disclosed herein.

In Step 316, the orchestrator determines that the user-selected solution was successful and the second edge device is now accessible (e.g., healthy, provisioned, etc.). In one or more embodiments, if the orchestrator determines that the user-selected solution was not successful, the orchestrator, via the GUI, may send a notification to the user to indicate that the issue(s) (related to the second edge device) are not resolved. Upon receiving the notification, the user may select a second solution (from the set of solutions, displayed/provided in Step 310 of FIG. 3.1) and direct the orchestrator to apply the second solution on the corresponding device.

In Step 318, the orchestrator displays, via the GUI, the latest status (e.g., a second status) of the second edge device to the user to indicate that the issue(s) (related to the second edge device) are resolved. In one or more embodiments, the method may end following Step 318.

Turning now to FIG. 3.3, the method shown in FIG. 3.3 may be executed by, for example, the above-discussed first edge device. Other components of the system (100) illustrated in FIG. 1.1 may also execute all or part of the method shown in FIG. 3.3 without departing from the scope of the embodiments disclosed herein.

In Step 320, upon receiving the device debug request from the orchestrator (in Step 304 of FIG. 3.1), the first edge device sends a session management request to the second edge device using the Layer 2 communication protocol (over the raw socket). Details of the session management request are described above in reference to FIG. 2.1.

In Step 322, in response to the session management request, the first edge device receives a session management response from the second edge device. Details of the session management response are described above in reference to FIG. 2.1.

In Step 324, in response to the device debug request, the first edge device sends the session management response to the orchestrator as the metadata (see Step 306 of FIG. 3.1). In one or more embodiments, the method may end following Step 324.

Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing edge devices (EDs), the method comprising: identifying, based on connectivity of each ED, a set of accessible EDs and a set of non-accessible EDs in an edge estate (EE); determining, based on the identifying, that a first ED in the EE is accessible and a second ED in the EE is non-accessible, wherein the second ED is non-accessible because of an issue associated with the second ED; sending, based on the determining, a device debug request related to the second ED to the first ED, wherein the first ED is used to troubleshoot the issue; receiving, in response to the device debug request, metadata associated with the second ED from the first ED; wherein the first ED and the second ED communicate with each other using a Layer 2 communication protocol without requiring a pre-determined Internet Protocol (IP) configuration, wherein the Layer 2 communication protocol is implemented on a raw socket, and wherein, using the Layer 2 communication protocol, the first ED communicates with the second ED based on a media access control (MAC) address of the second ED; analyzing the metadata to generate a set of solutions to resolve the issue; providing, via a graphical user interface (GUI), the issue and the set of solutions to a user to notify the user about a first status of the second ED; after the providing: receiving, via the GUI and from the user, a selected solution from the set of solutions to be applied on a computing device, wherein the computing device is the second ED or another device that is associated with the second ED; applying the selected solution on the computing device; and displaying, via the GUI, a second status of the second ED to the user to indicate that the issue is resolved.

2. The method of claim 1, wherein the first ED and the second ED are connected to each other over a local area network (LAN) cable.

3. The method of claim 1, wherein the issue specifies at least one selected from a group consisting of the second ED does not have a network configuration, the second ED is experiencing a fast identity online (FIDO) device onboarding (FDO) failure, the second ED is unprovisioned, the second ED is offline, and no secure connection is established between the second ED and an orchestrator.

4. The method of claim 1, wherein the first ED is accessible means that a secure connection between the first ED and an orchestrator is established.

5. The method of claim 1, wherein the metadata specifies at least one selected from a group consisting of failure details associated with the second ED, a network connection status of the second ED, the second ED is experiencing an operating system related problem, an error message related to the second ED, the second ED cannot connect to a rendezvous server, and the second ED is experiencing an FDO failure.

6. The method of claim 1, wherein the selected solution is at least one selected from a group consisting of performing an Internet Protocol (IP) address configuration, updating a rendezvous server's IP address, reconfiguring the rendezvous server, and performing a secure zero touch provisioning.

7. The method of claim 1, wherein, upon receiving the device debug request, the first ED sends a session management request to the second ED using a Layer 2 communication protocol, wherein, in response to sending the session management request, the first ED receives a session management response from the second ED, and wherein the first ED sends the session management response to an orchestrator as the metadata.

8. A non-transitory computer-readable medium comprising computer-readable program code, which when executed by a computer processor enables the computer processor to perform a method for managing edge devices (EDs), the method comprising: identifying, based on connectivity of each ED, a set of accessible EDs and a set of non-accessible EDs in an edge estate (EE); determining, based on the identifying, that a first ED in the EE is accessible and a second ED in the EE is non-accessible, wherein the second ED is non-accessible because of an issue associated with the second ED; sending, based on the determining, a device debug request related to the second ED to the first ED, wherein the first ED is used to troubleshoot the issue; receiving, in response to the device debug request, metadata associated with the second ED from the first ED; wherein the first ED and the second ED communicate with each other using a Layer 2 communication protocol without requiring a pre-determined Internet Protocol (IP) configuration, wherein the Layer 2 communication protocol is implemented on a raw socket, and wherein, using the Layer 2 communication protocol, the first ED communicates with the second ED based on a media access control (MAC) address of the second ED; analyzing the metadata to generate a set of solutions to resolve the issue; providing, via a graphical user interface (GUI), the issue and the set of solutions to a user to notify the user about a first status of the second ED; after the providing: receiving, via the GUI and from the user, a selected solution from the set of solutions to be applied on a computing device, wherein the computing device is the second ED or another device that is associated with the second ED; applying the selected solution on the computing device; and displaying, via the GUI, a second status of the second ED to the user to indicate that the issue is resolved.

9. The non-transitory computer-readable medium of claim 8, wherein the first ED and the second ED are connected to each other over a local area network (LAN) cable.

10. The non-transitory computer-readable medium of claim 8, wherein the issue specifies at least one selected from a group consisting of the second ED does not have a network configuration, the second ED is experiencing a fast identity online (FIDO) device onboarding (FDO) failure, the second ED is unprovisioned, the second ED is offline, and no secure connection is established between the second ED and an orchestrator.

11. The non-transitory computer-readable medium of claim 8, wherein the first ED is accessible means that a secure connection between the first ED and an orchestrator is established.

12. The non-transitory computer-readable medium of claim 8, wherein the metadata specifies at least one selected from a group consisting of failure details associated with the second ED, a network connection status of the second ED, the second ED is experiencing an operating system related problem, an error message related to the second ED, the second ED cannot connect to a rendezvous server, and the second ED is experiencing an FDO failure.

13. The non-transitory computer-readable medium of claim 8, wherein the selected solution is at least one selected from a group consisting of performing an Internet Protocol (IP) address configuration, updating a rendezvous server's IP address, reconfiguring the rendezvous server, and performing a secure zero touch provisioning.

14. The non-transitory computer-readable medium of claim 8, wherein, upon receiving the device debug request, the first ED sends a session management request to the second ED using a Layer 2 communication protocol, wherein, in response to sending the session management request, the first ED receives a session management response from the second ED, and wherein the first ED sends the session management response to an orchestrator as the metadata.

15. A system for managing edge devices (EDs), the system comprising: an edge estate (EE) comprising at least a first ED and a second ED; and an orchestrator, wherein the orchestrator is programmed to: identify, based on connectivity of each ED, a set of accessible EDs and a set of non-accessible EDs in the EE; determine, based on the identify, that the first ED is accessible and the second ED is non-accessible, wherein the second ED is non-accessible because of an issue associated with the second ED; send, based on the determine, a device debug request related to the second ED to the first ED, wherein the first ED is used to troubleshoot the issue; receive, in response to the device debug request, metadata associated with the second ED from the first ED; wherein the first ED and the second ED communicate with each other using a Layer 2 communication protocol without requiring a pre-determined Internet Protocol (IP) configuration, wherein the Layer 2 communication protocol is implemented on a raw socket, and wherein, using the Layer 2 communication protocol, the first ED communicates with the second ED based on a media access control (MAC) address of the second ED; analyze the metadata to generate a set of solutions to resolve the issue; provide, via a graphical user interface (GUI), the issue and the set of solutions to a user to notify the user about a first status of the second ED; after the providing: receive, via the GUI and from the user, a selected solution from the set of solutions to be applied on a computing device, wherein the computing device is the second ED or another device that is associated with the second ED; apply the selected solution on the computing device; and display, via the GUI, a second status of the second ED to the user to indicate that the issue is resolved.

16. The system of claim 15, wherein the issue specifies at least one selected from a group consisting of the second ED does not have a network configuration, the second ED is experiencing a fast identity online (FIDO) device onboarding (FDO) failure, the second ED is unprovisioned, the second ED is offline, and no secure connection is established between the second ED and an orchestrator.

17. The system of claim 15, wherein the metadata specifies at least one selected from a group consisting of failure details associated with the second ED, a network connection status of the second ED, the second ED is experiencing an operating system related problem, an error message related to the second ED, the second ED cannot connect to a rendezvous server, and the second ED is experiencing an FDO failure.

* * * * *